(12) United States Patent
Takata et al.

(10) Patent No.: US 7,443,986 B2
(45) Date of Patent: Oct. 28, 2008

(54) KEY ALLOCATING METHOD AND KEY ALLOCATION SYSTEM FOR ENCRYPTED COMMUNICATION

(75) Inventors: Osamu Takata, Yokohama (JP);
Takahiro Fujishiro, Yokohama (JP);
Tadashi Kaji, Yokohama (JP);
Kazuyoshi Hoshino, Komae (JP)

(73) Assignee: Hitachi, Ltd., Tokyo (JP)

( * ) Notice: Subject to any disclaimer, the term of this patent is extended or adjusted under 35 U.S.C. 154(b) by 665 days.

(21) Appl. No.: 10/931,219

(22) Filed: Sep. 1, 2004

(65) Prior Publication Data

US 2005/0226424 A1 Oct. 13, 2005

(30) Foreign Application Priority Data

Apr. 8, 2004 (JP) ............................. 2004-113732

(51) Int. Cl.
*H04L 9/00* (2006.01)
(52) U.S. Cl. ...................... 380/279; 713/153; 713/155
(58) Field of Classification Search ................ 713/153, 713/155; 380/279
See application file for complete search history.

(56) References Cited

U.S. PATENT DOCUMENTS

| | | | | |
|---|---|---|---|---|
| 5,164,988 A | * | 11/1992 | Matyas et al. ............... | 713/156 |
| 5,179,591 A | * | 1/1993 | Hardy et al. ................ | 713/171 |
| 5,230,020 A | * | 7/1993 | Hardy et al. ................ | 713/162 |
| 5,341,426 A | * | 8/1994 | Barney et al. ............... | 713/171 |
| 5,341,427 A | * | 8/1994 | Hardy et al. ................ | 380/273 |
| 5,465,300 A | * | 11/1995 | Altschuler et al. ........... | 380/30 |
| 5,588,059 A | * | 12/1996 | Chandos et al. ............. | 380/279 |
| 5,588,062 A | * | 12/1996 | Altschuler et al. ........... | 380/30 |
| 5,592,554 A | * | 1/1997 | Moehrmann ................ | 713/150 |
| 5,615,266 A | * | 3/1997 | Altschuler et al. .......... | 713/162 |
| 6,061,791 A | * | 5/2000 | Moreau ...................... | 713/171 |
| 6,094,487 A | * | 7/2000 | Butler et al. ................ | 380/270 |
| 6,446,210 B1 | * | 9/2002 | Borza .......................... | 726/4 |
| 6,584,562 B1 | * | 6/2003 | Fiori .......................... | 713/151 |

(Continued)

FOREIGN PATENT DOCUMENTS

JP 5-122217 5/1993

(Continued)

OTHER PUBLICATIONS

Baugher, Mark, et al. "MSEC Group Key Management Architecture", <draft-ietf-msec-gkmarch-07.txt> Internet Engineering Task Force, Jan. 30, 2003, pp. 1-10.

*Primary Examiner*—Nasser Moazzami
*Assistant Examiner*—David Garcia Cervetti
(74) *Attorney, Agent, or Firm*—McDermott Will & Emery LLP

(57) ABSTRACT

Both a management server and a validation server are installed. Both a terminal and a terminal register setting information which is usable in an encrypted communication in the management server. When carrying out the encrypted communication, the management server searches the registered setting information for coincident setting information. The management server generates keys for the encrypted communications which can be used by the terminals, and delivers these generated keys in combination with the coincident setting information. The management server authenticates both the terminals in conjunction with the validation server. Since the terminals trust such results that the management server has authenticated the terminals respectively, these terminals need not authenticate the respective communication counter terminals.

11 Claims, 10 Drawing Sheets

U.S. PATENT DOCUMENTS

| | | | |
|---|---|---|---|
| 6,788,788 B1 * | 9/2004 | Kasahara et al. | 380/277 |
| 6,845,160 B1 * | 1/2005 | Aoki | 380/286 |
| 7,089,211 B1 * | 8/2006 | Trostle et al. | 705/51 |
| 7,123,719 B2 * | 10/2006 | Sowa et al. | 380/247 |
| 7,146,009 B2 * | 12/2006 | Andivahis et al. | 380/277 |
| 7,234,058 B1 * | 6/2007 | Baugher et al. | 713/163 |
| 7,266,687 B2 * | 9/2007 | Sowa et al. | 713/163 |
| 7,298,847 B2 * | 11/2007 | Jing et al. | 380/247 |
| 7,353,388 B1 * | 4/2008 | Gilman et al. | 713/168 |
| 7,392,401 B2 * | 6/2008 | Kohara et al. | 713/193 |
| 2002/0172366 A1 * | 11/2002 | Peterka et al. | 380/277 |
| 2003/0016821 A1 * | 1/2003 | Hammersmith | 380/37 |
| 2003/0021418 A1 * | 1/2003 | Arakawa et al. | 380/277 |
| 2003/0026429 A1 * | 2/2003 | Hammersmith | 380/277 |
| 2003/0026431 A1 * | 2/2003 | Hammersmith | 380/277 |
| 2003/0061479 A1 * | 3/2003 | Kimura | 713/153 |
| 2003/0084282 A1 * | 5/2003 | Taruguchi | 713/155 |
| 2003/0112977 A1 * | 6/2003 | Ray et al. | 380/270 |
| 2003/0182566 A1 * | 9/2003 | Kohara et al. | 713/193 |
| 2004/0161110 A1 * | 8/2004 | Kanai et al. | 380/279 |
| 2005/0031119 A1 * | 2/2005 | Ding | 380/28 |
| 2005/0097317 A1 * | 5/2005 | Trostle et al. | 713/163 |
| 2005/0141720 A1 * | 6/2005 | Watanabe et al. | 380/279 |

FOREIGN PATENT DOCUMENTS

| | | |
|---|---|---|
| JP | 2000-049766 | 2/2000 |

* cited by examiner

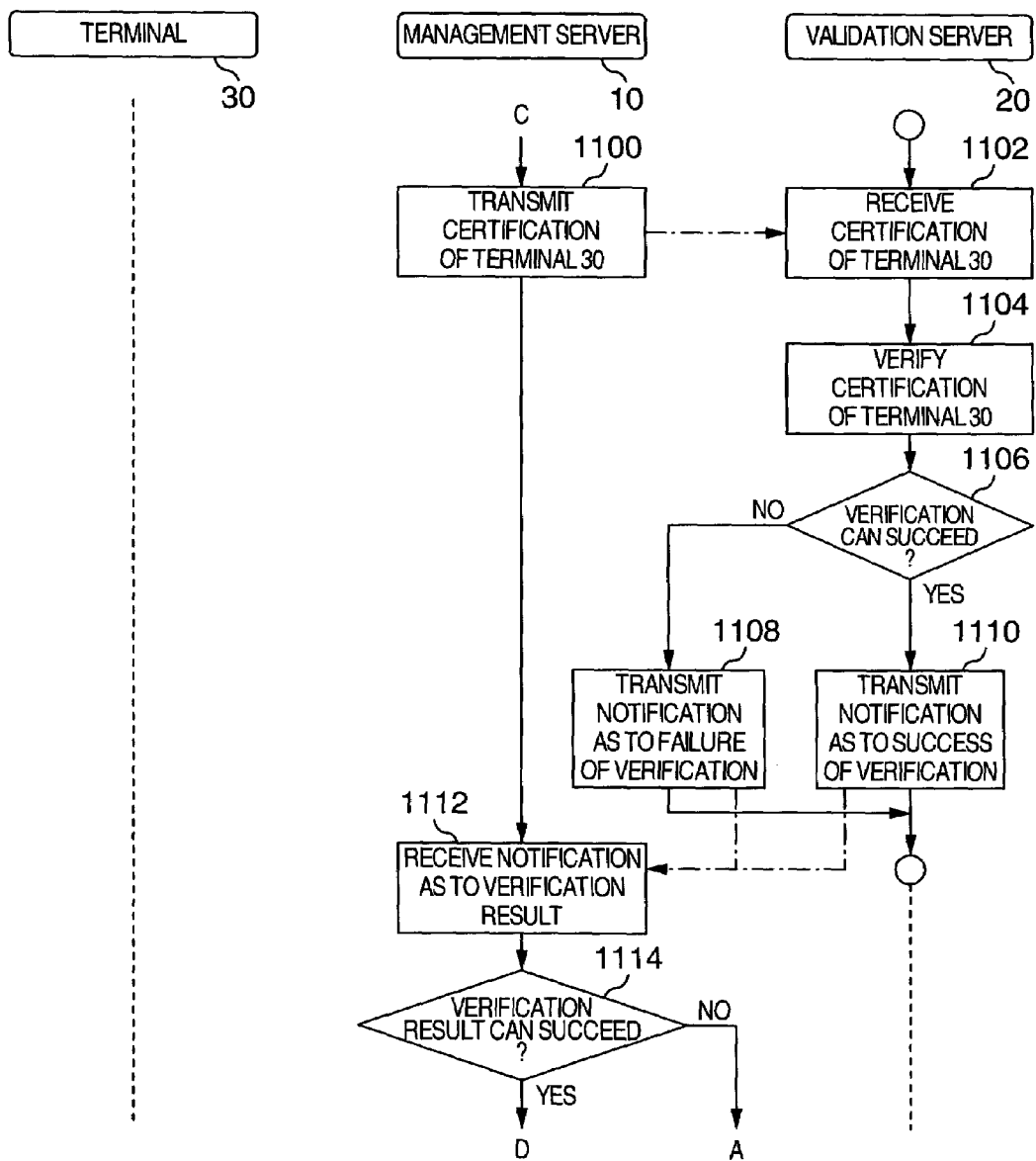

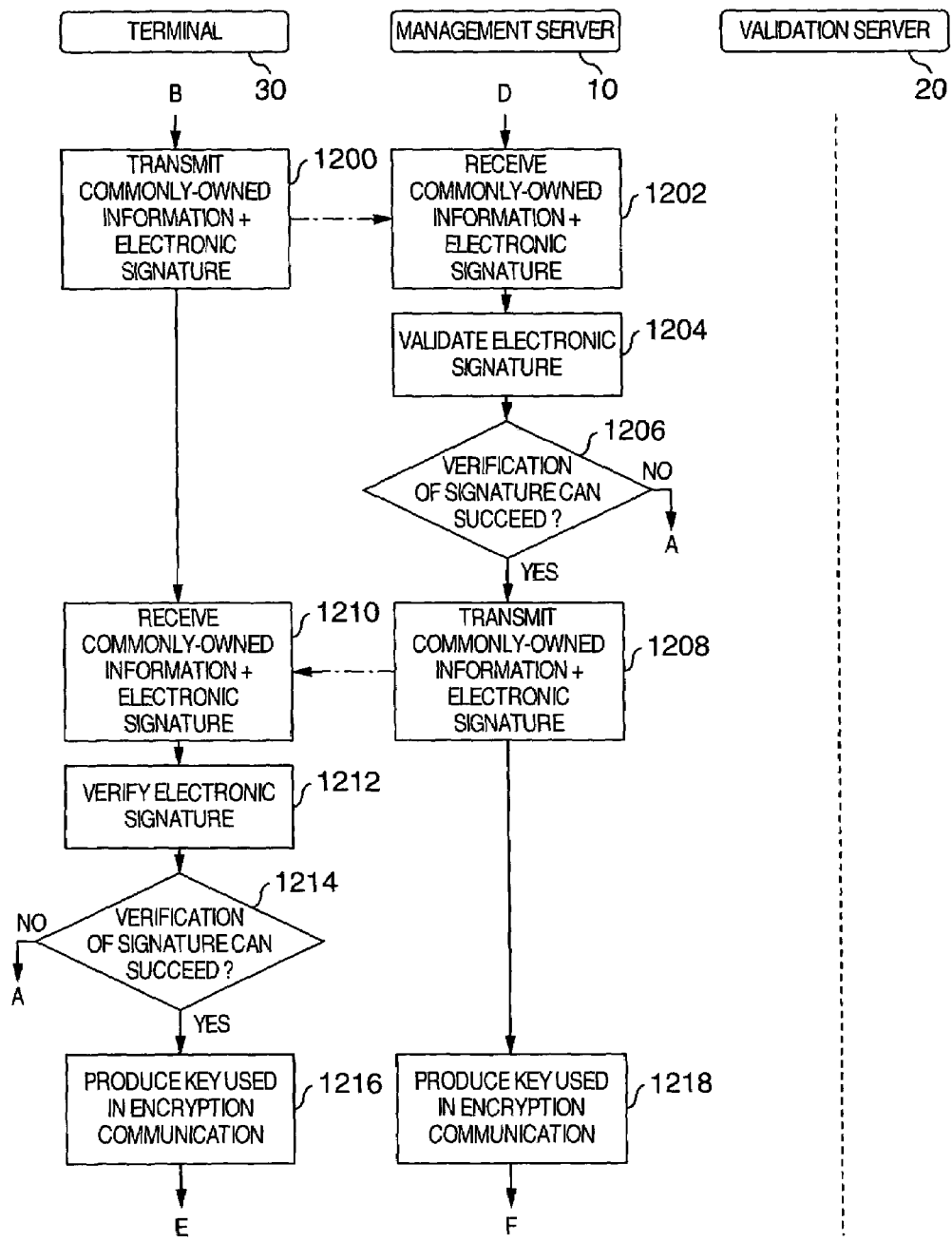

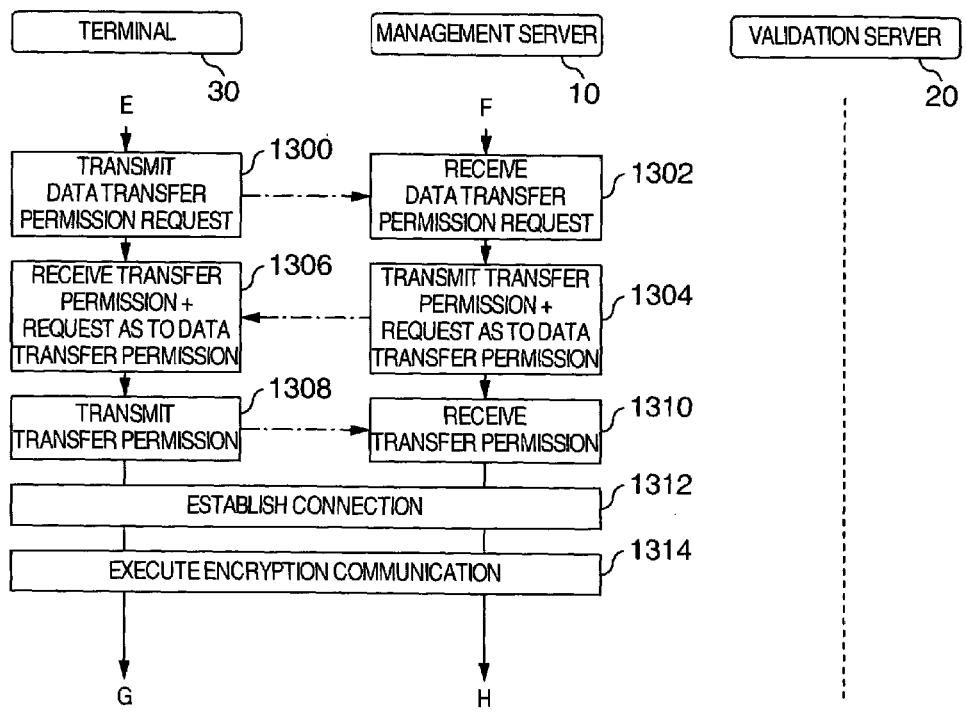
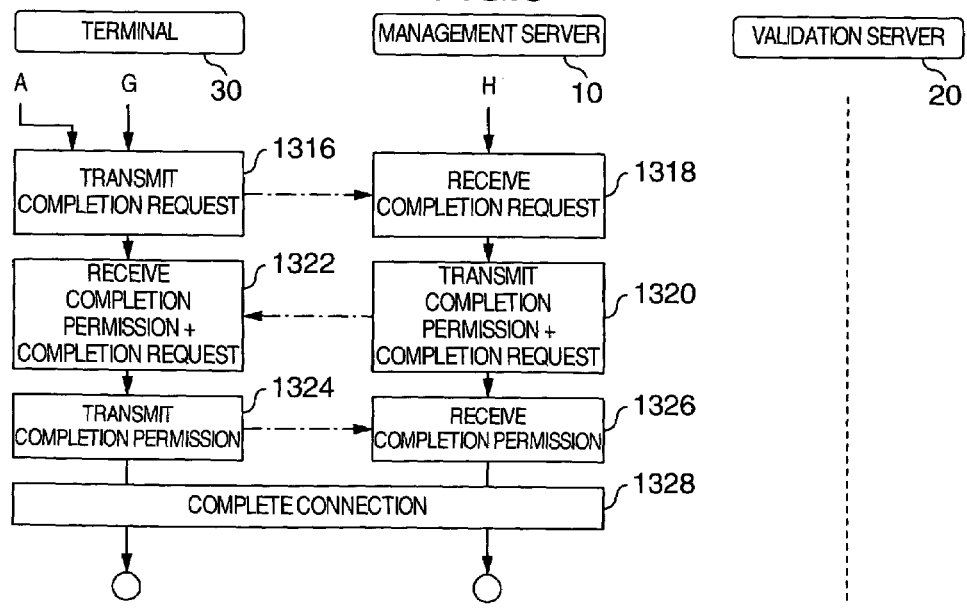

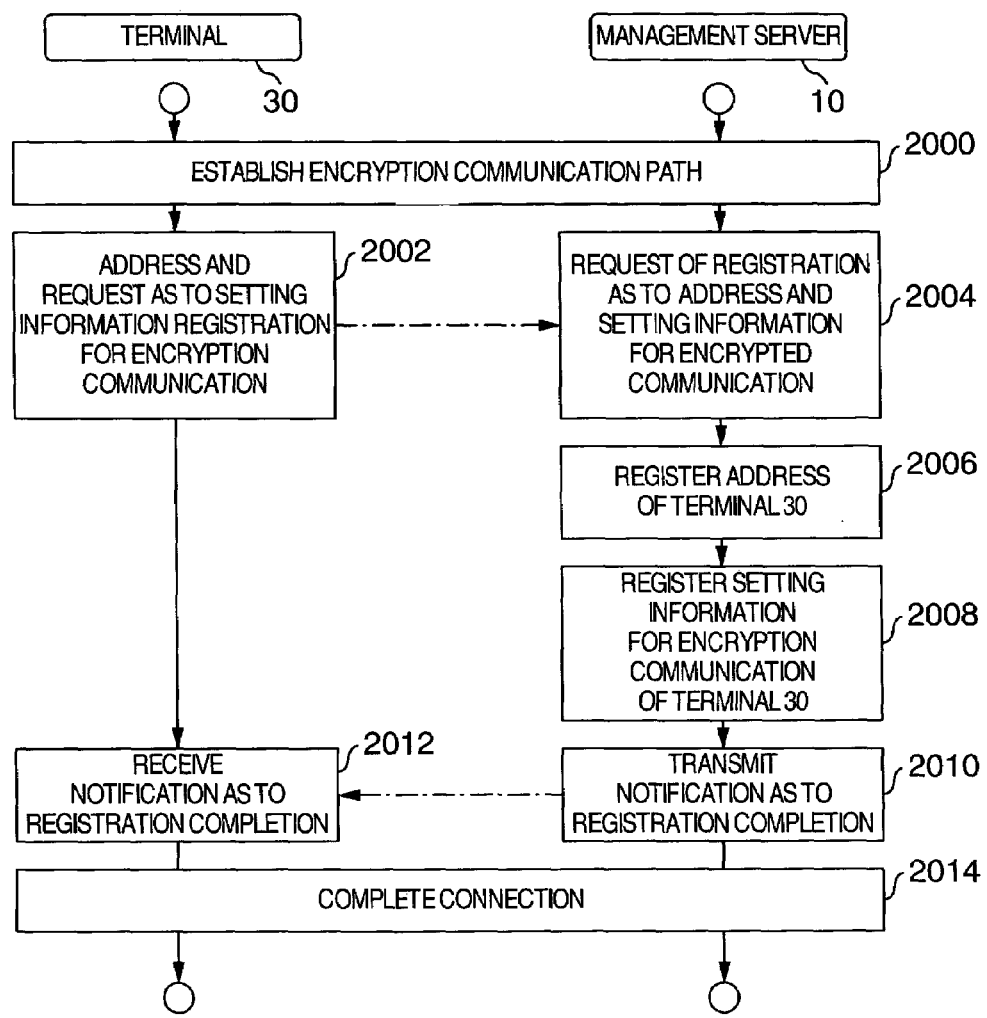

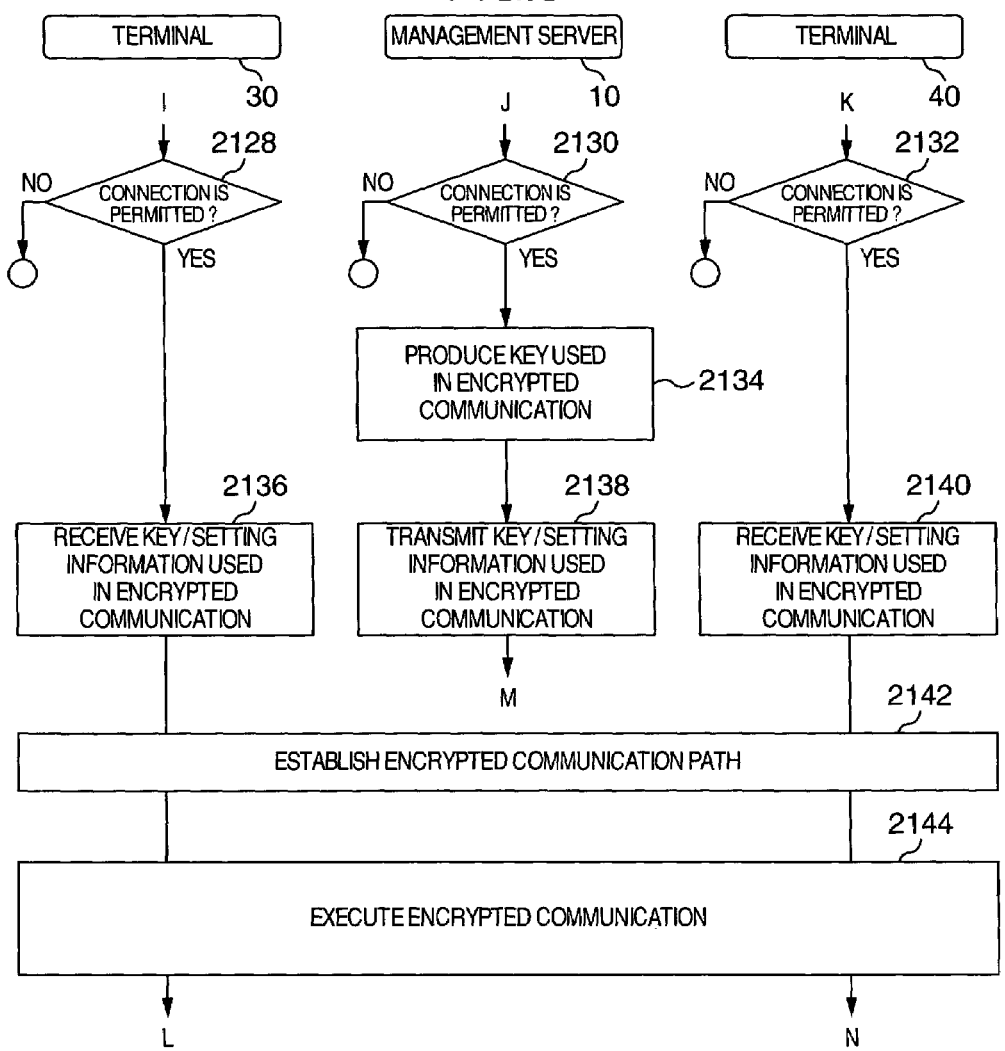

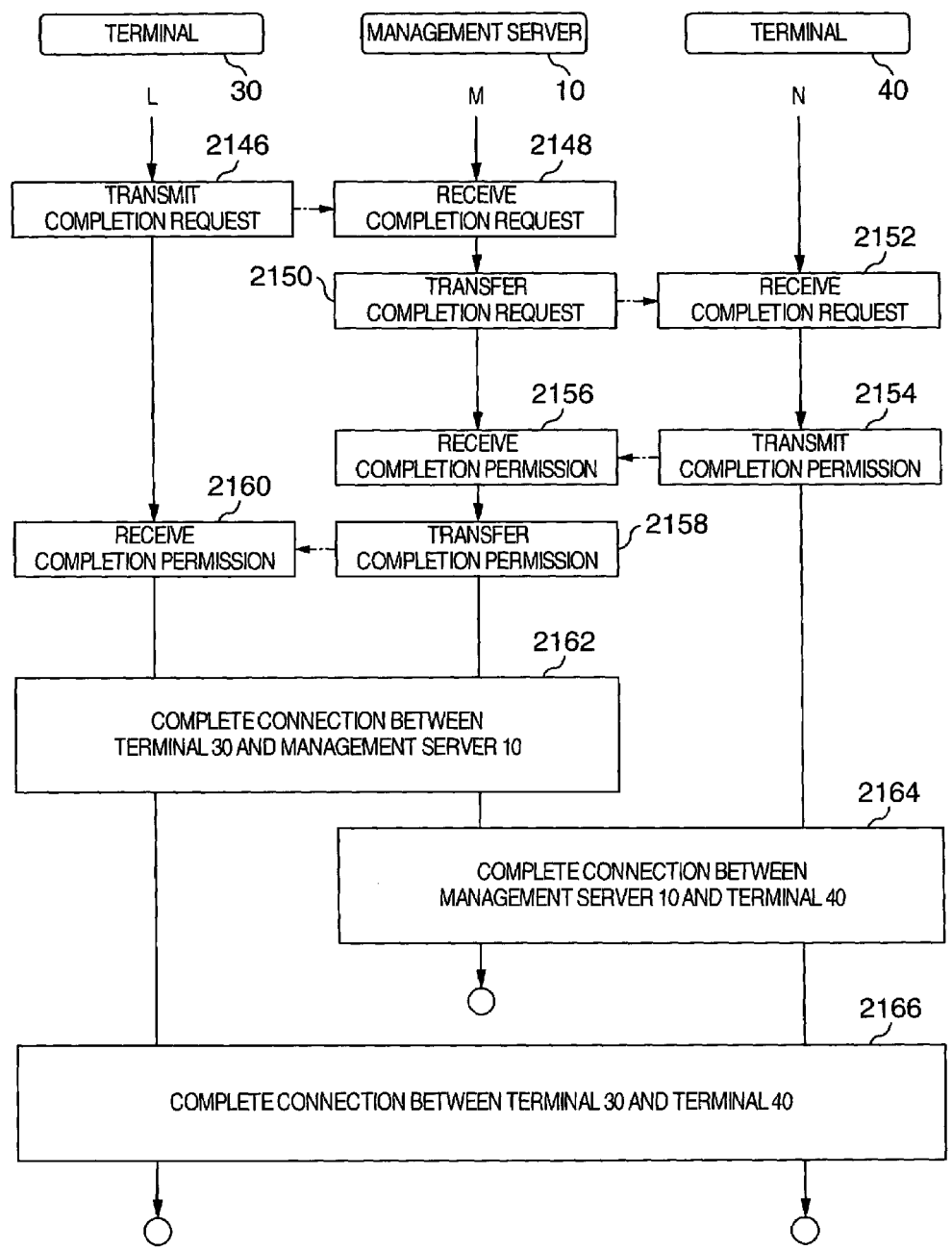

FIG.11

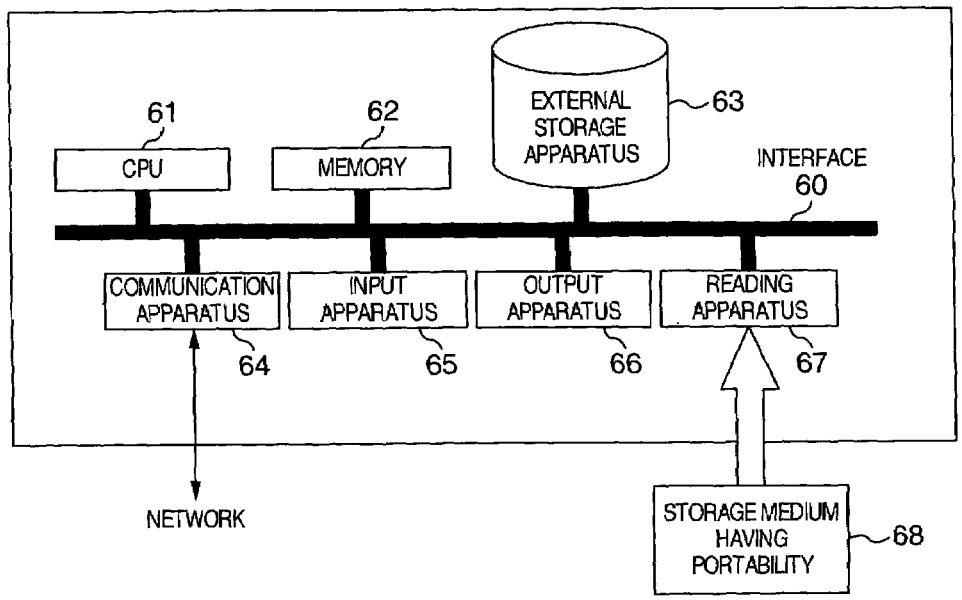

FIG.12

EXAMPLE OF ADDRESS DB 112

| TERMINAL NAME | IP ADDRESS | |
|---|---|---|
| TERMINAL 30 | 10.0.0.1 | 700 |
| TERMINAL 40 | 10.1.0.1 | 702 |
| . . . | . . . | 704 |

FIG.13

EXAMPLE OF SETTING INFORMATION DB 111

SETTING INFORMATION OF TERMINAL 30

| SETTING INFORMATION | PRIORITY ORDER | |
|---|---|---|
| | | 800 |
| SETTING INFORMATION "A" | 1 | 802 |
| SETTING INFORMATION "B" | 2 | 804 |
| SETTING INFORMATION "C" | 3 | 806 |

SETTING INFORMATION OF TERMINAL 40

| SETTING INFORMATION | PRIORITY ORDER | |
|---|---|---|
| | | 810 |
| SETTING INFORMATION "B" | 1 | 812 |
| SETTING INFORMATION "A" | 2 | 814 |

KEY ALLOCATING METHOD AND KEY ALLOCATION SYSTEM FOR ENCRYPTED COMMUNICATION

INCORPORATION BY REFERENCE

This application claims priority based on a Japanese patent application, No. 2004-113732 filed on Apr. 8, 2004, the entire contents of which are incorporated herein by reference.

BACKGROUND

The present invention is related to a method for allocating keys used in encrypted communications to both a communication source terminal and a communication destination terminal, and also related to a key allocation system.

In the case that both a communication source apparatus and a communication destination apparatus (will be simply referred to as "terminals" hereinafter) perform an encrypted communication via a network, data of the communication is encrypted and then the encrypted data is transmitted/received. While both the communication source terminal and the communication destination terminal have previously and commonly owned both setting information and keys which are used in an encrypted communication between the communication source terminal and the communication destination terminal, the communication source terminal is encryption-communicated with the communication destination terminal by employing the setting information and the keys, which are commonly owned.

For instance, in a case that a key is shared by employing public key encryption, the below-mentioned encrypted communication will be carried out.

That is, a communication source terminal acquires a public key of a communication destination terminal, produces a key which is used so as to perform an encrypted communication with the communication destination terminal, and encrypts this key used for the encrypted communication by employing this public key, and then, transmits the encrypted key to the communication destination terminal. Also, the communication destination terminal receives the key used for the encrypted communication, which has been encrypted by this public key of the communication destination terminal, and then, decrypts the received encrypted key based upon a private key of the communication destination terminal.

In the above-explained method, in order that the communication source terminal executes encrypted communications with respect to plural communication destination terminals, this communication source terminal and the respective communication destination terminals must commonly own the setting information and the keys used for the encrypted communications. Therefore, there is such a problem that loads of the communication source terminal are increased.

As a consequence, the below-mentioned encrypted communication technique has been proposed. That is, while a server apparatus (will be referred to as "server" hereinafter) which allocates both the setting information and the key for the encrypted communication to both a communication source terminal and a communication destination terminal is installed on a network, both the communication source terminal and the communication destination terminal execute an encrypted communication by employing the above-described setting information and keys for the encrypted communication. Mark Baugher et. al., "MSEC Group Key Management Architecture <draft-ietf-msec-gkmarch-07.txt>", Jan. 30, 2003, IETF (Internet Engineering Task Force) pages 3 to 13, refer to: <URL: http://www.ietf.org/internet-drafts/draft-ietf-msec-gkmarch-07.txt>.

Also, in order that a validity of a communication counter party is confirmed in a communicating operation established via a network, the communication counter party must be authenticated before the communicating operation is carried out. As one of methods for authenticating communication counter parties, such an authenticating method with employment of an electronic signature is provided. Concretely speaking, both a communication source terminal and a communication destination terminal, which are communicated to each other, exchange IDs and public key s, to which electronic signatures have been applied. Then, both the communication source terminal and the communication destination terminal verify both the received electronic signatures and the received public key s so as to authenticate the communication counter parties with each other.

SUMMARY OF THE INVENTION

In order that a communication source terminal executes encrypted communications with respect to a plurality of communication destination terminals, this communication source terminal and the respective communication destination terminals must commonly own setting information and keys used for this encrypted communication, so that loads given to the communication source terminal are increased.

For instance, in order that a communication source terminal commonly owns keys used for an encrypted communication with respect to a communication destination terminal by employing a public key encryption, the communication source terminal must perform the following process operations, namely, the communication source terminal acquires a public key of the communication destination terminal, produces a key which is used so as to perform the encrypted communication with the communication destination terminal, and encrypts this key used for the encrypted communication by employing the acquired public key, so that loads given to the communication source terminal are increased.

To solve this problem, in such a case that the technique of the above-explained non-patent publication 1 is employed, the server produces the setting information and the keys used in the encrypted communication between the communication source terminal and the communication destination terminal, and then allocates these setting information and keys to the communication source terminal and the communication destination terminal. It should be noted that terminals do not always support the setting information and the keys, which have been allocated. In such a case that both setting information and keys, which are not supported, are allocated to either the communication source terminal or the communication destination terminal, the encrypted communication cannot be carried out between the communication source terminal and the communication destination terminal.

Also, in order that a communication source terminal and a communication destination terminal confirm validities of the communication counter parties, each of the communication source terminal and the communication destination terminal executes such a process operation for authenticating the communication counter parties. However, in such a case that the communication source terminal performs encrypted communications with a plurality of communication destination terminals, this communication source terminal must authenticate the respective communication destination terminals so as to confirm validities of the communications counter parties, so that processing loads given to this communication source terminal are increased.

The present invention provides a communication system in which a management server for managing communications between terminals is arranged on a network.

In the communication system of the present invention, since the below-mentioned steps are carried out, both a communication source terminal and a communication destination terminal commonly own a key which is utilized in an encrypted communication executed between the communication source terminal and the communication destination terminal.

Both the communication source terminal and the communication destination terminal have previously registered such setting information which may be used in the encrypted communication into the management server.

When the communication source terminal is connected to the communication destination terminal, the communication source terminal notifies this connection to the management server, and then, the management server searches the plural pieces of the registered setting information for setting information, which of the communication source terminal is coincident with one of the communication destination terminal.

The management server produces either keys or information which constitutes seeds of the keys based upon the coincident setting information, which are used in the encrypted communication. Then, the management server allocates the produced keys or the produced information to the communication source terminal and the communication destination terminal in combination with the coincident setting information. In such a case that both the setting information and the information which constitutes the seeds of the keys are allocated from the management server to both the communication source terminal and the communication destination terminal, both the communication source terminal and the communication destination terminal produce keys from the information which constitute the seeds of the keys. And then, execute an encrypted communication by employing the setting information allocated from the management server and also either the produced keys or the transmitted keys.

Also, the above-described communication system is featured by that since the management server authenticates both the communication source terminal and the communication destination terminal by using electronic signatures, therefore this communication system may assume that both the communication source terminal and the communication destination terminal mutually authenticate the communication counter parties.

In the case that the management server is requested to establish a communication with the communication destination terminal by the communication source terminal, the management server authenticates both of these communication terminals. When the management server can succeed in the authentication, this management server permits the communication between both the terminals. After the management server has permitted this communication, the communication source terminal can be connected to the communication destination terminal.

Furthermore, the management server may alternatively request such a validation server apparatus (will be referred to as "validation server" hereinafter) for verifying both a public key certificate of the communication source terminal and a public key certificate of the communication destination terminal.

Since the validation server verifies the public key s, the management server can more firmly authenticate both the communication source terminal and the communication destination terminal.

In accordance with the present invention, the communication source terminal no longer executes such a process operation that both the setting information and the keys are shared with the communication destination terminal, which are employed so as to perform the encrypted communication between the communication source terminal and the communication destination terminal.

In addition, both the communication source terminal and the communication destination terminal can firmly carry out the encrypted communication.

Also, in accordance with the present invention, both the communication source terminal and the communication destination terminal need not directly authenticate the communication counter parties, so that processing loads given to these communication terminals can be reduced.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 3 is a flow chart for exemplifying a process operation in which the management server 10 requests a validation server 20 to verify the public key certificate of the terminal 30, and the validation server 20 responds a validation result.

FIG. 4 is a flow chart for exemplifying a process operation in which both the terminal 30 and the management server 10 authenticate the counter party with each other by employing electronic signatures, and the terminal 30 and the management server 10 produce keys respectively, which are used in the encrypted communication between the terminal 30 and the management server 10.

FIG. 5 is a flow chart for exemplifying a process operation executed until the terminal 30 and the management server 10 perform an encrypted communication after the terminal 30 and the management server 10 have established a connection.

FIG. 6 is a flow chart for exemplifying a process operation in which both the terminal 30 and the management server 10 accomplish the connection.

FIG. 7 is a flow chart for exemplifying a process operation in which the terminal 30 registers both an address of the terminal 30 and setting information used in an encrypted communication with another terminal in the management server 10.

FIG. 9 is a flow chart for exemplifying a process operation in which the management server 10 produces keys used in the encrypted communication between the terminal 30 and the terminal 40, and allocates the produced keys to the terminal 30 and the terminal 40.

FIG. 10 is a flow chart for exemplifying a process operation in which the terminal 30 accomplishes the connection with respect to the terminal 40 via the management server 10.

FIG. 11 is a diagram for exemplifying a hardware structural example as to each of the management server 10, the validation server 20, the terminal 30, and the terminal 40.

FIG. 12 is an example of a content of an address DB 112 held by the management server 10.

FIG. 13 is an example of a setting information DB 111 held by the management server 10.

DETAILED DESCRIPTION OF THE EMBODIMENTS

An embodiment mode of the present invention will now be explained in detail. It should be understood that the present invention is not restricted by this embodiment mode.

Figure 1:
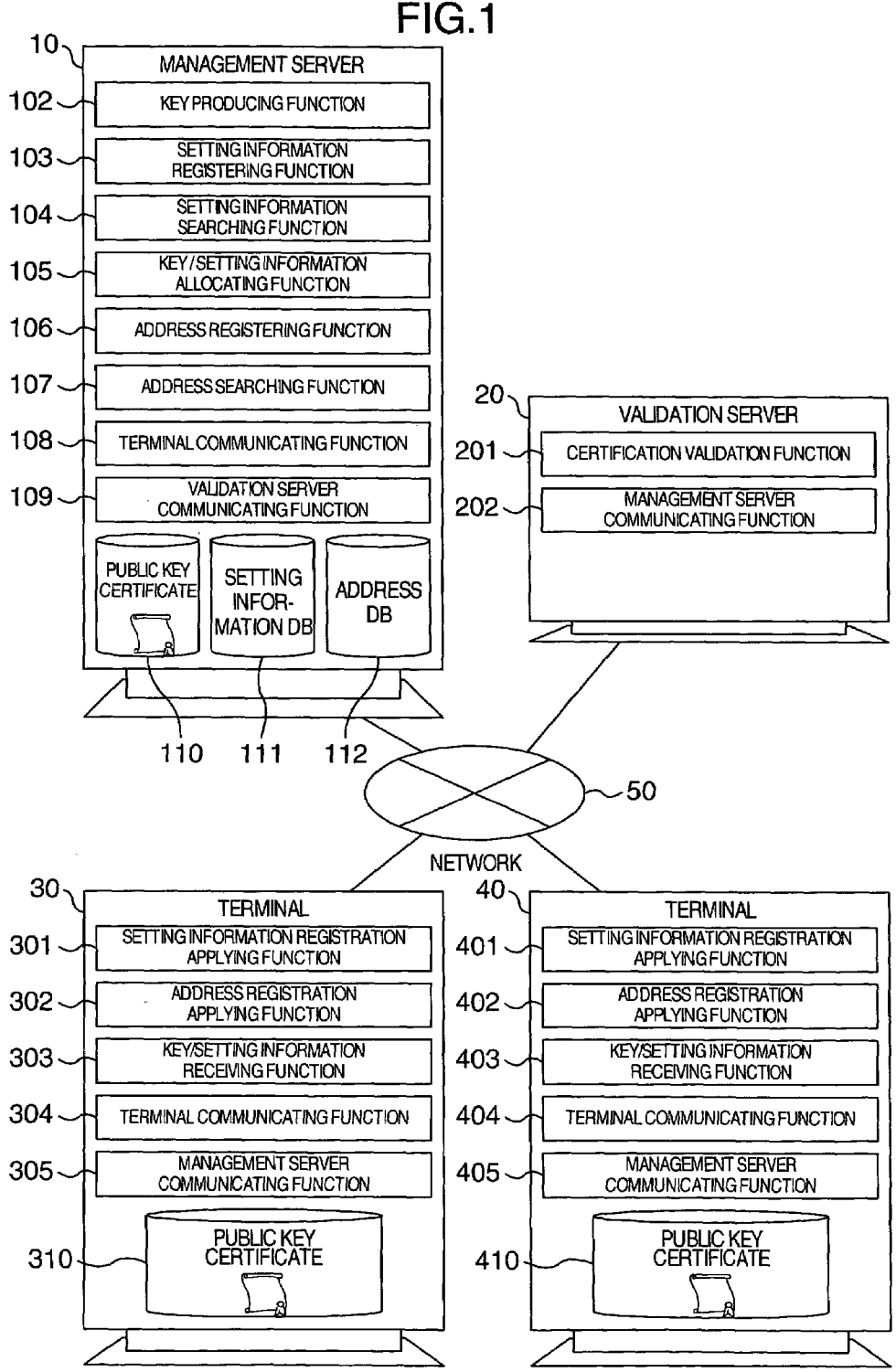
FIG. 1 is a diagram for exemplifying an arrangement of a communication system according to an embodiment mode of the present invention.

FIG. 1 is a block diagram for indicating an arrangement of a key allocation system according to an embodiment mode of the present invention.

In the key allocation system of FIG. 1, a terminal 30, another terminal 40, a management server apparatus (will be referred to as "management server" hereinafter) 10, a validation server apparatus (will be referred to as "validation server" hereinafter) 20 are connected to a network 50.

The terminal 30 and the terminal 40 store thereinto a public key certificate 310 and a public key certificate 410, respectively, which have been issued from a reliable authentication station respectively. The terminal 30 and the terminal 40 are further provided with setting information registration applying functions 301 and 401, address registration applying functions 302 and 402, key/setting information receiving functions 303 and 403, communicating function with terminal 304 and communicating function with terminal 404, and also communicating function with management server 305 and communicating function with management server 405, respectively. The setting information registration applying functions 301 and 401 are employed so as to perform an encrypted communication between these terminals 30 and 40. The address registration applying functions 302 and 402 are employed so as to register addresses for specifying positions of the relevant terminals on the network 50. The key/setting information receiving functions 303 and 403 request an execution of an encrypted communication between these terminals 30 and 40, and receive necessary keys and necessary setting information from the management server 10. The communicating function with terminal 304 and communicating function with terminal 404 execute an encrypted communication between these terminals 30 and 40.

The management server 10 stores thereinto a public key certificate 110, a setting information DB (database) 111, and an address DB 112. The public key certificate 110 has been issued from the reliable authentication station. The setting information DB 111 is employed in order that both the terminal 30 and the terminal 40 execute an encrypted communication. The address DB 112 is used so as to specify positions of both the terminal 30 and the terminal 40 on the network 50. In this embodiment, an IP (Internet Protocol) address is employed as the above-described terminal address.

The management server 10 is furthermore equipped with a key producing function 102, a setting information registering function 103, a setting information searching function 104, a key/setting information allocating function 105, an address registering function 106, an address searching function 107, a communicating function with terminal 108, and a communicating function with validation server 109. The key producing function 102 produces a key used in an encrypted communication between the terminal 30 and the terminal 40. The setting information registering function 103 registers setting information by accepting a registering application of setting information issued from either the terminal 30 or the terminal 40. The setting information searching function 104 searches the setting information which have been registered by the terminal 30 and the terminal 40 for setting information, which of the terminal 30 is coincident with one of the terminal 40 when a connection is established from the terminal 30 to the terminal 40. The key/setting information allocating function 105 allocates keys and setting information in order to perform an encrypted communication between the terminal 30 and the terminal 40. The address registering function 106 registers an address to the address DB 112 by accepting a registering application of an address issued from either the terminal 30 or the terminal 40. The address searching function 107 searches the address DB 112 for an address of a terminal. The communicating function with terminal 108 performs authentication and a communication of a terminal. The communicating function with validation server 109 performs a communication with the validation server 20.

The validation server 20 is provided with a certificate validating function 201, and a communicating function with management server 202. The certificate validating function 201 confirms a validity of a public key certificate when the management server 10 authenticates the terminal 30, or the terminal 40.

It should be noted that both the respective apparatuses as to the management server 10, the validation server 20, the terminal 30, and the terminal 40, and the respective functions of these apparatuses may be realized by that a CPU 61 executes predetermined programs which are loaded on the memory 62 in such a computer as shown in, for example, FIG. 11. That is, the computer is equipped with the CPU 61, the memory 62, an external storage apparatus 63 such as a hard disk drive, a communication apparatus 60, an input apparatus 65 such as a keyboard and a mouse, an output apparatus 66 such a monitor and a printer, a reading apparatus 67, and an interface 60 for transmitting/receiving data among these apparatuses. The communication apparatus 64 is communicated to another apparatus via a network, or a LAN (will be referred to as "network" hereinafter) such as the Internet. The reading apparatus 67 reads information from a storage medium 68 having a portability.

These programs may be previously stored in either the memory 62 or the external storage apparatus 63, which are employed in the above-described computer. Alternatively, these programs may be conducted via either the detachable storage medium 68 or a communication medium (network, or LAN 50, or carrier waves and digital signals transmitted via these network and LAN 50), if required.

It should also be understood that in this embodiment, although the terminal can be realized by utilizing the arrangement shown in FIG. 11, the present invention is not limited thereto. Each apparatus of the terminal 30 and the terminal 40 shown in FIG. 1 may be realized by any apparatus equipped with a communication interface capable of being connected to the network 50. For example, a router, a PC (Personal Computer), a portable telephone, a PDA (Personal Digital Assistant), a television, a refrigerator, and the like may alternatively constitute such a terminal.

Next, a description is made of operations as to a communication system according to this embodiment mode.

In the communication system according to this embodiment mode, the terminal 30 establishes a secure communication path with respect to the management server 10 via the network 50.

In this case, such an operation is indicated. That is, the terminal 30 establishes an encrypted communication path with respect to the management server 10, performs an encrypted communication, and then accomplishes the encrypted communication. When the terminal 30 establishes this encrypted communication path, the terminal 30 transmits a public key certificate of the terminal 30 to the management server 10, whereas the management server 10 requests the validation server 20 to verify a validity of the transmitted public key, and this management server 10 authenticates the terminal 30 based upon a validation result as to the validity of the public key.

Figure 2:
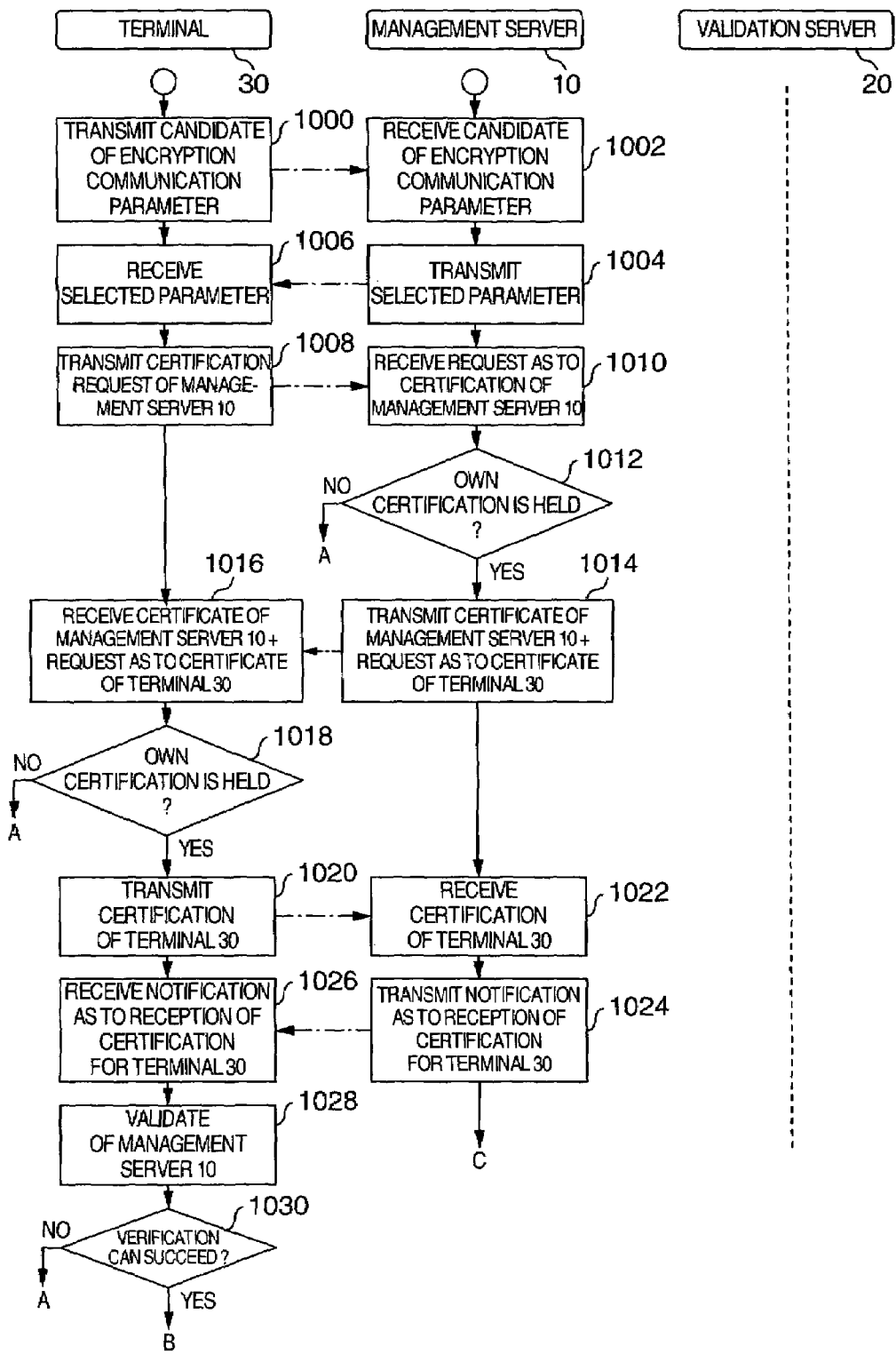
FIG. 2 is a flow chart for exemplifying a process operation in which both a terminal 30 and a management server 10 commonly own a parameter used in an encrypted communication between the terminal 30 and the management server 10, and exchange a public key.

First, both the terminal 30 and the management server 10 exchange a public key certificate 310 and another public key certificate 110 in accordance with a flow operation shown in FIG. 2.

The communicating function with management server 305 transmits one, or more candidates for parameters which are used to execute an encrypted communication with respect to the management server 10 (step 1000). The parameters used in the encrypted communication contain a sort of an encryption algorithm used in encryption of communication data, a length of a key, a sort of hash function which is employed so as to detect an alteration of the communication data, and the like.

The communicating function with terminal 108 receives the candidate of the encrypted communication parameter transmitted from the terminal 30 (step 1002).

The management server 10 selects one of the parameters which can be used by the management server 10 from the received candidates for the parameters, and then transmits the selected parameter to the terminal 30 by the communicating function with terminal 108 (step 1004).

The communicating function with management server 305 receives the parameter selected by the management server 10 (step 1006).

Since the process operations defined from the step 1000 to the step 1006 are executed, both the terminal 30 and the management server 10 commonly own the parameter.

The communicating function with management server 305 transmits a request for the public key certificate 110 of the management server 10 to the management server 10 (step 1008).

The communicating function with terminal 108 receives the request for the public key certificate 110 sent from the terminal 30 (step 1010).

In the case that the management sever 10 holds the public key certificate 110 received by the request in the step 1010 (YES in step 1012), the management server 10 transmits both the public key certificate 110 of the management server 10 and the request for the public key certificate of the terminal 30 to the terminal 30 by the communicating function with terminal 108 (step 1014).

The communicating function with management server 305 receives both the public key certificate 110 of the management server 10 and the request for the public key certificate of the terminal 30 (step 1016).

In such a case that the terminal 30 holds the public key certificate 310 whose request has been received in the step 1016 (YES in step 1018), the terminal 30 transmits the public key certificate 310 of the terminal 30 by the communicating function with management server 305 to the management server 10 (step 1020).

The communicating function with terminal 108 receives the public key certificate 310 of the terminal 30 from the terminal 30 (step 1022).

The communicating function with terminal 108 transmits a reception notification as to the public key certificate 310 of the terminal 30 (step 1024).

The communicating function with management server 305 receives the reception notification as to the public key certificate 310 of the terminal 30 from the management server 10 (step 1026).

The communicating function with management server 304 verifies the public key certificate 110 by verifying a valid time limit and a signature of the public key certificate 110 received in the step 1016 (step 1028).

In the case that the terminal 30 can succeed in the validation of the public key certificate 110 (YES in step 1030), the process operation is advanced to a process operation of FIG. 3.

In the case that the judgement result becomes NO in the above-explained step 1012, step 1018, or step 1030, the process operation is advanced to a step 1316(A) in which a process operation for accomplishing a communication between the terminal 30 and the management server 10 is carried out. It should be noted that FIG. 6 shows such a case that the terminal 30 issues the request for accomplishing the communication. In the case that the process operation is advanced from the step 1012, since the management server 10 issues the request for accomplishing the communication, the operation of the terminal 30 is replaced by the operation of the management server 10.

Next, the management server 10 requests the validation server 20 to verify the public key certificate of the terminal 30, and then accepts a validation result in accordance with a flow chart shown in FIG. 3.

The communicating function with validation server 109 transmits the public key certificate 310 of the terminal 30 to the validation server 20 (step 1100).

The communicating function with management server 202 receives the public key certificate 310 (step 1102).

The validation server 20 verifies the received public key certificate 310 by the certificate validating function 201. It should also be understood that when validation of the public key certificate 201 is carried out, the validation server 20 verifies a valid time limit, a signature, and an invalidated status of the public key certificate (step 1104).

In the case that validation 1104 of the public key certificate 310 cannot succeed (NO in step 1106), the validation server 20 transmits a validation failure notification to which a signature of the validation server 20 has been applied, to the management server 10 by the communicating function with management server 202 (step 1108).

In the case that validation 1104 of the public key certificate 310 can succeed (YES in step 1106), the validation server 20 transmits a validation success notification to which a signature of the validation server 20 has been applied, to the management server 10 by the communicating function with management server 202 (step 1110).

The management server 10 receives either the validation failure notification or the validation success notification, which have been transmitted in either the step 1108 or the step 1110 by the communicating function with validation server 109, and verifies the signature of the validation server 20 which has been applied to the notification so as to confirm that the notification has been surely transmitted form the validation server 20 and has not been altered (step 1112).

When the management server 10 receives the validation success notification in the step 1112, the management server 10 advances the process operation to a process operation (D) of FIG. 4. When the management server 10 receives the validation failure notification in the step 1112, the management server 10 advances the process operation to a step 1316 (A) of FIG. 6 in order to accomplish the connection to the terminal 30. It should also be noted that since the management server 10 issues the communication accomplish request, the operation of the terminal 30 is replaced by the operation of the management server 10 of FIG. 6.

Next, as indicated in FIG. 4, both the terminal 30 and the management server 10 may authenticate the counter party with each other in such a manner that the electronic signatures are attached to the commonly-owned information in the step of FIG. 2, the resulting commonly-owned information is exchanged, and then, the exchanged electronic signatures are verified. Thereafter, the terminal 30 and the management server 10 commonly own the keys. It should also be understood that as the commonly-owned information, arbitrary information within the information exchanged in the step of FIG. 2 may be utilized.

Firstly, the terminal 30 produces an electronic signature with respect to the commonly-owned information, and attaches the electronic signature to the commonly-owned information, and then, transmits the resulting commonly-owned information to the management server 10 by the communicating function with management server 305 (step 1200).

The communicating function with terminal 305 receives both the commonly-owned information and the electronic signature from the terminal 30 (step 1202).

The management server 10 verifies the received electronic signature by employing the public key of the public key certificate 310 of the terminal 30 received in the step 1022 (step 1204).

In such a case that the management server 10 can succeed the validation of the electronic signature (YES in step 1206), the management server 10 produces an electronic signature with respect to the commonly-owned information, and attaches the electronic signature to the commonly-owned information, and then, transmits the resulting commonly-owned information to the terminal 30 by the communicating function with terminal 108 (step 1208).

The communicating function with management server 305 receives both the commonly-owned information and the electronic signature from the management server 10 (step 1210).

The terminal 30 verifies the received electronic signature by employing the public key of the public key certificate 110 of the management server 10 received in the step 1016 (step 1212).

In the case that the terminal 30 can succeed the validation of the electronic signature (YES in step 1214), the process operation is advanced to a key producing step 1216 which is provided for an encrypted communication between the terminal 30 and the management server 10.

The terminal 30 produces such a key which is used to perform an encrypted communication with respect to the management server 10 based upon the parameters which have been commonly owned from the step 1000 to the step 1006 (step 1216).

The management server 10 also produces such a key which is used to perform an encrypted communication with respect to the terminal 30 based upon the parameters which have been commonly owned from the step 1000 to the step 1006 (step 1218).

In the case that the judgment result becomes NO in either the step 1206 or the step 1214 (in the case that validation of electronic signature fails), the process operation is advanced to a step 1316(A) of FIG. 6. It should also be noted that the process operation of FIG. 6 indicates such a case that the terminal 30 requests a completion of the communication operation. When the process operation is advanced from the step 1206, since the management server 10 issues a communication completion request, the operation of the terminal 30 is replaced by the operation of the management server 10.

Since the above-described process operations are executed, the terminal 30 authenticates the management server 10, and the management server 10 authenticates the terminal 30. Also, both the terminal 30 and the management server 10 commonly own the key which is employed so as to perform the encrypted communication between the terminal 30 the management server 10.

If the terminal 30 and the management server 10 could authenticate the counter parties with each other, then both the terminal 30 and the management server 10 establish a communication connection so as to execute an encrypted communication.

FIG. 5 is a sequence diagram for describing such a step that a connection is established so as to execute the above-explained encrypted communication and then, this encrypted communication is carried out.

The communicating function with management server 305 transmits a data transfer permission request to the management server 10 (step 1300), and the communicating function with terminal 108 receives this transmitted-data transfer permission request (step 1302).

The communicating function with terminal 108 transmits both the data transfer permission and a data transfer permission with respect to the terminal 30 to the terminal 30 (step 1304), and then, the communicating function with management server 305 receives this data transfer permission and the data transfer permission request (step 1306).

The communicating function with management server 305 transmits the data transfer permission to the management server 10 (step 1308), and the communicating function with terminal 108 receives this data transfer permission (step 1310).

Since the above-described process operations are carried out, both the terminal 30 and the management server 10 mutually issue the data transfer permissions, so that the connection may be established (step 1312).

After the connection has been established, both the terminal 30 and the management server 10 execute an encrypted communication by employing both the parameters used for the encrypted communication which have been commonly used in the step 1000 through step 1006 of FIG. 2, and the keys used for the encrypted communication which have been produced in the step 1216 and the step 1218 (step 1314).

When the terminal 30 and the management server 10 need not require the encryption path, both the terminal and the management server 10 accomplish the connection in accordance with the sequential operation shown in FIG. 6. In the case that the above-described encrypted communication is accomplished, firstly, the communicating function with management server 305 transmits a communication completion request with respect to the management server 10 to the management server 10 (step 1316).

The communicating function with terminal 108 receives this communication completion request (step 1318).

The communicating function with terminal 108 transmits both a communication completion permission and a communication completion permission request to the terminal 30 (step 1320), and then, the communicating function with management server 305 receives these communication accomplish permission and communication permission request (step 1322).

The communicating function with management server 305 transmits the communication completion permission to the management server 10 (step 1324), and the communicating function with terminal 108 receives this communication completion permission (step 1326).

Since the above-described process operation is carried out, both the terminal 30 and the management server 10 have mutually issued the communication completion permissions, so that the connection is completed (step 1328).

As previously explained, since the process operations defined from FIG. 2 to FIG. 6 are carried out, both the terminal 30 and the management server 10 can mutually authenticate the counter parties with each other, and can establish the encrypted communication path between the terminal 30 and the management server 10 so as to execute the encrypted communication, and then, can complete the encrypted communication.

In this embodiment mode, in order that the management server 10 strictly authenticates the terminal 30, the management server 10 requests the validation server 20 to verify the public key certificate 310 by executing the process operation shown in FIG. 3.

Furthermore, in order that the terminal 30 strictly authenticates the management server 10, the terminal 30 may alternatively request the validation server 20 to verify the publication key certificate 110. Instead of the process operations defined in both the step 1028 and the step 1030, since the process operations executed by the terminal 30 are replaced by these by the management server 10 in FIG. 3, the terminal 30 may alternatively request the validation server 20 to verify the public key certificate 110.

In a flow chart shown in FIG. 7, while the terminal 30 employs the encrypted communication path established by the operation sequences explained from FIG. 2 to FIG. 5, the terminal 30 registers both an address and setting information used to execute an encrypted communication with another terminal into the management server 10.

First of all, both the terminal 30 and the management server 10 establish the above-explained encrypted communication path by executing the process operations defined from the step 1000 to the step 1030, from the step 1100 to the step 1114, from the step 1200 to the step 1218, and also, from the step 1300 to the step 1312 (these steps are combined with each other which will be referred to as "step 2000").

Next, both the address registration applying function 302 and the setting information registration applying function 301 of the terminal 30 request the management server 10 to register the address of the terminal 30, and also to register the setting information used to perform the encrypted communication with another terminal by employing the communicating function with management server 305 (step 2002). It should also be noted that in this step 2002, more than one registration request for the setting information is transmitted. It should also be understood that the setting information contains, for example, a sort of encryption algorithm used so as to encrypt communication data, a length of a key, a sort of hash function employed so as to detect alternation of communication data, and the like.

The communicating function with terminal 108 receives the relevant address and the setting information used for the encrypted communication (step 2004).

The address registering function 106 of the management server 10 registers this received address into the address DB 112 by the address registering function 106 of FIG. 1 (step 2006), the detailed explanation of which will be made later.

The setting information registering function 103 registers this received setting information into the setting information DB 111 (step 2008).

In order that the management server 10 notifies such a fact that the above-described address and setting information have been registered to the terminal 30, the management server 10 transmits a registration completion notification to the terminal 30 by employing the communicating function with terminal 108 (step 2010). The communicating function with management server 305 receives this registration completion notification (step 2012).

Both the terminal 30 and the management server 10 execute the process operations defined from the above-described step 1316 to step 1326 so as to complete the connection (these steps are combined with each other which will be referred to as "step 2014").

Since the above-described process operations of FIG. 7 are carried out, the terminal 30 can register the own address and the setting information which is used so as to perform the encrypted communication with another terminal into the management server 10.

Since process operations similar to those of FIG. 7 are carried out, the terminal 40 can also register the address of the own terminal 40 and the setting information which is used so as to perform the encrypted communication with another terminal into the management server 10 by way of both the address registration applying function 402 and the setting information registration applying function 401.

In the case that the terminal 40 performs the registering operation, both the terminal and the management server 10 execute such a flow operation that the terminal 30 of FIG. 7 has been substituted by the terminal 40.

It should also be noted that both the terminal 30 and the terminal 40 may alternatively delete the addresses and the setting information, which have been registered in the management server 10. When these addresses and setting information are deleted, the terminal 30 and the terminal 40 execute such a process operation that "registration" of FIG. 7 has been replaced by "deletion."

In the process operation of FIG. 7, both the terminal 30 and the terminal 40 register addresses into the management server 10, which are allocated to the own terminals. In the case that the addresses allocated to the own terminals are changed, the terminal 30 and the terminal 40 are required to again perform the process operations of FIG. 7 in order to register the latest addresses.

For instance, in the case that an address corresponds to an IP address and a terminal has dynamically accepted an IP address allocation, when a power supply of the terminal is turned OFF, ON, and the terminal is reset, there are some possibilities that the IP address is changed. Also, in such a case that a terminal accomplishes a connection to the network and is connected to another network at a move destination, there are some possibilities that an IP address of the terminal is changed. When there are some possibilities that the IP address of the terminal has been changed, since the terminal again performs the process operation of FIG. 7, the terminal registers the latest IP address to a management server.

Figure 8:
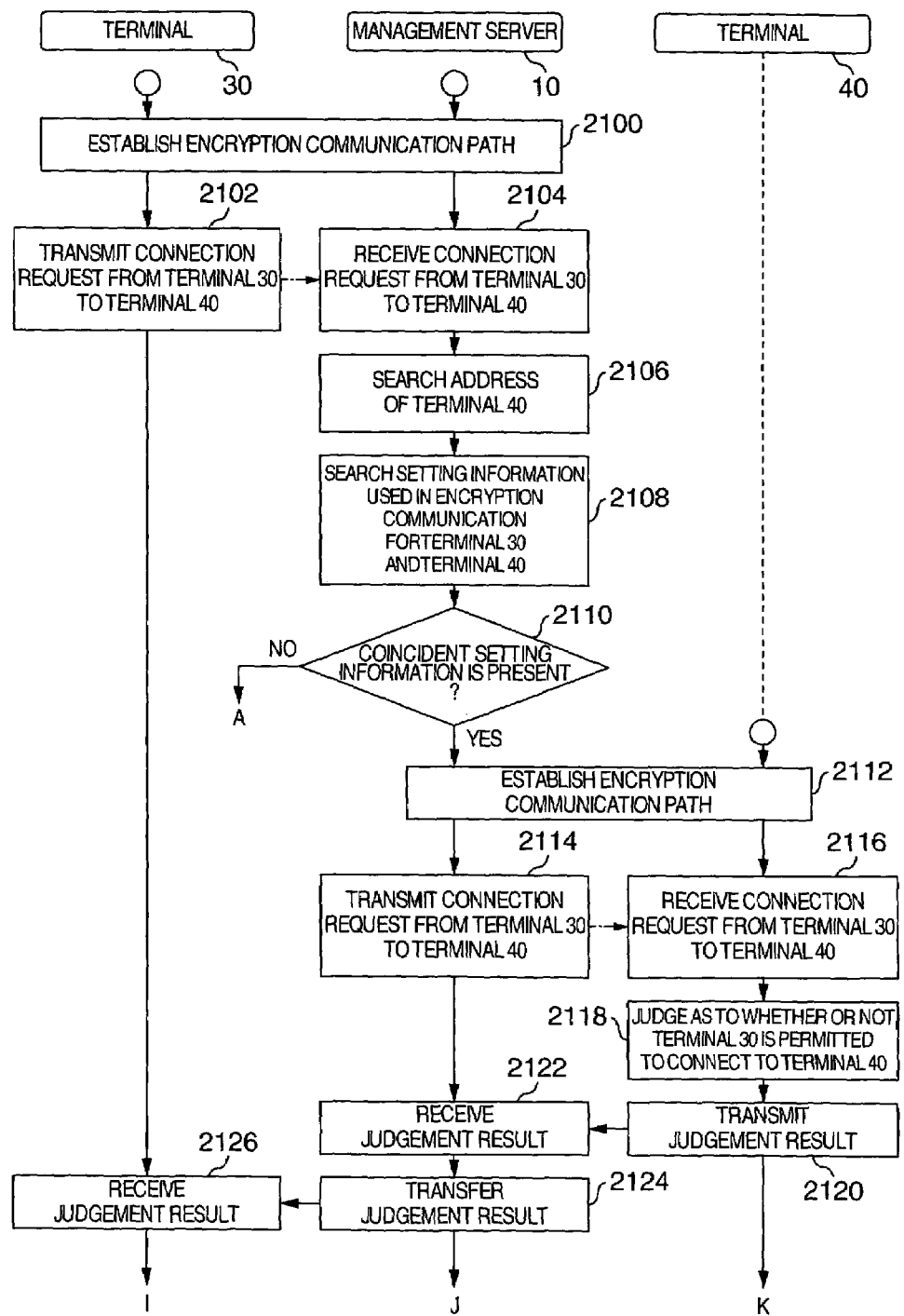
FIG. 8 is a flow chart for exemplifying a process operation in which when both the terminal 30 and the management server 10 perform a connecting process operation, the management server 10 searches such setting information which have been registered by the terminal 30 and the terminal 40 for coincident setting information.

If both the terminal 30 and the terminal 40 register both positions (IP addresses) on the network and the setting information for the encrypted communication between the other terminal into the management server 10 in the sequential operation of FIG. 7, then the terminal 30 executes a connection process operation with respect to the terminal 40 via the management server 10 in accordance with the flow charts shown in FIG. 8 and FIG. 9.

Both the terminal 30 and the terminal 40 establish an encrypted communication path by executing the process operations defined from the above-described step 1000 to step 1030, the process operations defined from the step 1100 to step 1114, the process operations defined from the above-described step 1200 to step 1218, the process operations defined from the step 1300 to step 1312 (these steps are combined with each other, which will be referred to as "step 2100").

The key/setting information receiving function 303 of the terminal 30 transmits a connection request for the terminal 40 to the management server 10 by the communicating function with management server 305 (step 2102), and then, the communicating function with terminal 108 receives this connection request (step 2104). It should also be understood that the connection request contains such an information, as an ID for identifying a connection counter party (terminal 40) will be referred to as "terminal ID" hereinafter. As the terminal ID, a fixed item within a domain may be used. For instance, a name of a terminal, and a MAC address of a terminal may be used. Also, in such a closed domain as an internal form, such information may also be used, namely, a mail address of a user of a terminal, SIP-URI of a terminal, and FQDN (Fully Qualified Domain Name) of a terminal may be used.

In order to acquire an address of the terminal 40 corresponding to a connection destination of the terminal 30, the management server 10 searches the address DB 112 of FIG. 2 based upon the address searching function 107 of FIG. 1, while a terminal ID is used as a key (step 2106).

The management server 10 searches the setting information DB 111 of FIG. 1 so as to acquire candidates of the setting information as to the terminal 30 and the terminal 40. Then, the management sever 10 searches the acquired setting information by the setting information searching function 104 of FIG. 1, for such setting information, which of the terminal 30 is coincident with one of terminal 40 each other from (step 2108).

When one, or more pieces of setting information of the terminal 30 and setting information of the terminal 40 are made coincident with each other (YES in step 2110), the management server 10 establishes an encrypted communication path between the terminal 40 and the own management server 10 by executing the process operations defined from the step 1000 to the step 1030, the process operations defined from the step 1100 to the step 1114, the process operations defined from the step 1200 to the step 1218, and the process operations defined from the step 1300 to the step 1312 (these steps are combined with each other, which will be referred to as "step 2112").

In order that the encrypted communication path is established between the management server 10 and the terminal 40, it is so assumed that such process operations of FIG. 2, FIG. 4, and FIG. 5 that the terminal 30 has been replaced by the management server 10 and the management server 10 has been replaced by the terminal 40 are carried out, while both the management server 10 and the terminal 40 are equipped with the above-explained functions which are required to execute these process operations.

Furthermore, in the step 2112, in order that the management server 10 requests the validation server 20 to verify a public key certificate of the terminal 40, the operation of the management server 10 is advanced from the step 1026 of FIG. 2 to "C" of FIG. 3, and advanced from "D" of FIG. 3 to "B" in FIG. 4. Also, the operation of the terminal 40 is advanced from "C" of FIG. 2 to "D" of FIG. 4.

In the case that the setting information of the terminal 30 is not made coincident with the setting information of the terminal 40 in the step 2110, the process operation is advanced to "A" of FIG. 6, and the management server 10 describes such an indication that the connection is not permitted because the setting information of the terminal 30 is not made coincident with the terminal 40 in a message under processing operation of FIG. 6, and then, notifies the resulting message to the terminal 30 so as to complete the connection between the terminal 30 and the management server 10. It should also be noted that FIG. 6 shows the process operations in the case that the terminal 30 requests the completion of the communicating operation. In such a case that the process operation is advanced from the step 2110, since the management server 10 issues the communication completion request, the operations of the terminal 30 are replaced by the operations of the management server 10.

Subsequent to the step 2112, the communicating function with terminal 108 transmits to the terminal 40 by using the established encrypted communication path, the connection request which has been issued from the terminal 30 to the terminal 40 and has been received in the step 2104 (step 2114). The communicating function with management server 405 receives this transmitted connection request (step 2116).

The terminal 40 judges as to whether the received connection request is permitted, or refused based upon either the status of the own terminal or the status of the user (for instance, whether or not communication can be presently carried out), and a filtering function by the specific policy of the terminal 40 (step 2118).

The communicating function with management server 405 transmits the above-explained judgment result to the management server 10 (step 2120), and then, the communicating function with terminal 108 receives this judgement result (step 2122).

The communicating function with terminal 108 transfers the received judgement result to the terminal 30 (step 2124), and then, the communicating function with management server 305 receives this transmitted judgement result (step 2126).

Since the above-described process operations are carried out, an agreement can be made as to whether or not the connection between the terminal 30 and the terminal 40 is permitted by employing the encrypted communication path established between the terminal 30 and the management server 10, and also, the encrypted communication path established between the terminal 40 and the management server 10.

Next, in accordance with a flow chart shown in FIG. 9, the management server 10 produces a key used in an encrypted communication between the terminal 30 and the terminal 40 based upon the coincident setting information which has been searched for in the step 2108 of FIG. 8, and then, allocates the key used in the encrypted communication and the setting information to both the terminal 30 and the terminal 40. Both the terminal 30 and the terminal 40 establish an encrypted communication path by employing the allocated keys and setting information.

The terminal 30, the management server 10, and the terminal 40 judge a result as to whether or not the connection has been permitted in the step 2118 (step 2128, step 2130, step 2132). Since the judgement result of the step 2118 is reflected to the judging operations of the step 2128, the step 2130, and the step 2132, all of the judgment results become the same results, namely either "YES" or "NO."

In the case that the judgment results become "NO", the terminal 30, the management server 10, and the terminal 40 accomplish the process operations.

In the case that the judgment results become YES, the key producing function 102 of the management server 10 produces a key used in an encrypted communication between the terminal 30 and the terminal 40 based upon the coincident setting information has been searched for in the step 2108 (step 2134). It should also be noted that in the step 2134, instead of this key used in the encrypted communication, information which constitutes a seed of the key used in the encrypted communication may be the alternatively produced.

The management server 10 transmits both either the key or the information which constitutes the seed of the key, which have been produced in the step 2134, and also the coincident setting information which has been searched for in the step 2108 by the key/setting information allocating function 105 to both the terminal 30 and the terminal 40 (step 2138). The terminal 30 and the terminal 40 receive the above-described information by the key/setting information receiving functions 303 and 403 (step 2136 and step 2140).

Both the communicating function with terminal 304 of the terminal 30 and the communicating function with terminal 404 of the terminal 40 establish an encrypted communication path by utilizing the keys and the setting information used for the encrypted communication between the terminal 30 and the terminal 40 (step 2142).

In such a case that the management server 10 produces the information which constitutes the seed of the key used for the encrypted communication between the terminal 30 and the terminal 40 in the step 2134, and allocates the produced information in the step 2138, both the key/setting information receiving functions 304 and 403 produce keys used for this encrypted communication by employing the information which constitute the seeds of the keys used for the encrypted communication and has been allocated. Then, both the communicating function with terminal 304 and communicating function with terminal 404 establish encrypted communication paths by utilizing the produced keys and the received setting information.

Both the terminal 30 and the terminal 40 perform an encrypted communication by employing the above-explained encrypted communication paths which have been established by the communicating function with terminal 304 and communicating function with terminal 404 (step 2144).

Since the above-explained process operations are carried out, the management server 10 allocates both either the keys or the information which constitutes the seeds of the keys and the setting information to both the terminal 30 and the terminal 40, which are required for the encrypted communications between the terminal 30 and the terminal 40, so that both the terminal 30 and the terminal 40 carry out the encrypted communication.

When the terminal 30 and the terminal 40 complete the encrypted communication (step 2144), the terminal 30 and the terminal 40 accomplish the communicating operation in accordance with a flow chart of FIG. 10.

The communicating function with management server 305 transmits a completion request to the management server 10 (step 2146), and then, the communicating function with terminal 108 receives this completion request (step 2148).

The communicating function with terminal 108 transfers the received completion request to the terminal 40 (step 2150), and then, the communicating function with management server 405 receives this completion request (step 2152).

The communicating function with management server 405 transmits completion permission to the management server 10 (step 2154), and then, the communicating function with terminal 108 receives this completion permission (step 2156).

The communicating function with terminal 108 transfers the received completion permission to the terminal 30 (step 2158), and then, the communicating function with management server 405 receives this completion permission (step 2160).

Since the above-described process operations of FIG. 10 are carried out, both the terminal 30 and the management server 10 complete the connection of the encrypted communication path between the terminal 30 and the management server 10, which has been established in the step 2100 of FIG. 8 (step 2162), whereas both the terminal 40 and the management server 10 complete the connection of the encrypted communication path between the terminal 40 and the management server 10, which has been established in the step 2112 of FIG. 8 (step 2164).

Also, both the terminal 30 and the terminal 40 complete the connection of the encrypted communication path between the terminal 30 and the terminal 40, which has been established in the step 2142 of FIG. 9 (step 2166).

It should also be understood that both the terminal 30 and the terminal 40 need not always execute the flow operations shown in FIG. 10 so as to accomplish the communicating operation, but may alternatively accomplish the communicating operation without executing the flow operation of FIG. 10.

In the case that the flow operation indicated in FIG. 10 is not carried out, since the terminal 30, the management server 10, and the terminal 40 need not perform the process operations of FIG. 10, a process load is lowered. Also, if the encrypted communication paths established in the step 2100 and the step 2112 are accomplished before the step 2142, then the communication resource between the terminal 30 and the management server 10, and the communication resource between the management server 10 and the terminal 40 may be reduced.

Also, both the terminal 30 and the management server 10 accomplish the encrypted communication path which has been established in the step 2100 after the step 2136 and the step 2138, and may again establish an encrypted communication path after the step 2144. Alternatively, both the terminal 40 and the management server 10 accomplish the encrypted communication path which has been established in the step 2112 after the step 2138 and the step 2140, and may again establish an encrypted communication path after the step 2144.

In this alternative case, during the encrypted communication of the step 2144, either both the terminal 30 and the management server 10 or both the management server 18 and the terminal 40 need not establish the encrypted communication path, so that the communication resource may be reduced.

In the above-described process operation of FIG. 8, when the encrypted communication path is established in the step 2100, both the terminal 30 and the management server 10 authenticate the counter parties with each other, and also, when the encrypted communication path is established in the step 2112, both the terminal 40 and the management server 10 authenticate the counter parties with each other. As a result, the terminal 30 can confirm a validity of the terminal 40 via the management server 10, and the terminal 40 can confirm a validity of the terminal 30 via the management server 10.

Also, since the above-described process operations of FIG. 8 and FIG. 9 are carried out, the management server 10 searches the plural setting information for the encryption communicating operations between the terminal 30 and the terminal 40 for the coincident setting information, the plural setting information have been previously registered by the terminal 30 and the terminal 40, and the management server 10 delivers both the coincident setting information and either the keys for the encryption communicating operations or the information which constitutes the seeds of the keys. As a result, both the terminal 30 and the terminal 40 can perform the encryption communicating operation by employing the allocated keys and the allocated setting information.

In this embodiment mode, in such a case that a function capable of handling personal information of the users as to the terminals 30 and 40 is additionally provided with the management server 10, in order to avoid that the personal information of the users transmitted by the terminals 30 and 40 to the management sever 10 is leaked, in the step 2000 of FIG. 7, concretely speaking, since the process operations defined from FIG. 2 to FIG. 6 are carried out, the encrypted communication path is established. In such a case that the management server 10 does not handle the personal information, the communication path need not be encrypted. In the case that the communication path is not encrypted, in the steps for establishing the encrypted communication paths of FIG. 2, FIG. 3, FIG. 4, FIG. 5, and FIG. 6, the above-explained step 1216 and step 1218 of FIG. 4 are omitted, whereas in the above-described step 1314 of FIG. 5, the communicating operation is not encrypted.

Next, a partial operation of the flow operations which have been so far described will now be explained in detailed.

In the step 2006 of FIG. 7, the address of the terminal 30 is registered in the address DB 112 of FIG. 1. A table 700 shown in FIG. 12 exemplifies an example of the address DB (database) 112.

Subsequently, registering and searching operations of the address DB 112 will be explained.

The address registration applying function 302 of the terminal 30 transmits the address to the management server 10 in the registration request transmission in the step 2002 of FIG. 2.

The address registering function 106 of the management server 10 registers the address of the terminal 30 received in the step 2004 in the address DB 112 in the step 2006.

The address DB 112 may be constituted in the form of, for example, the table 700 shown in FIG. 12. The table 700 stores thereinto pairs of information (terminal IDs) for specifying terminals and addresses, which are contained in the connection request which is received by the management server 10 in the step 2104.

In the example of the table 700, respective terminal IDs and respective addresses of the terminal 30 and the terminal 40 are stored in an entry 702 and another entry 704. It should also be noted that as to a single terminal, a single entry is stored. In such a case that the information indicated in the example of the table 700 has already been registered in the address DB 112, when a terminal again registers an IP address, the address registering function 106 updates a portion of an IP address of such an entry related to this terminal by the process operation of the step 2006.

Also, the address searching function 106 of the management server 10 searches the address of the terminal 40 corresponding to the connection request destination of the terminal 30 in the step 2106 of FIG. 8.

In the step 2106, the address searching function 107 of the management server 10 acquires the IP address information of the terminal 40 with reference to the entry 704 of FIG. 12.

In the step 2008 of FIG. 7, both the terminal 30 and the terminal 40 register one, or more pieces of the setting information for the encrypted communication, which can be used in the encrypted communications with respect to other terminals into the setting information DB 111 of FIG. 1. In the step 2108 of FIG. 8, the terminal 30 and the terminal 40 search for the coincident setting information from the plural setting information with reference to the setting information DB 111.

Subsequently, both the registering operation of the setting information DB 111 and the searching operation as to the coincident setting information with respect to this setting information DB 111 will be described.

The setting information registration applying function 301 of one terminal transmits one, or more candidates as to the setting information for the encrypted communication with respect to another terminal to the management server 10 by transmitting the setting information registration request in the step 2002. It should also be noted that when two, or more pieces of the setting information are registered, priority orders are applied to candidates of the setting information, and then, the resulting candidates are transmitted.

The setting information registering function 103 of the management server 10 registers the candidate as to the setting information for the encrypted communication of the terminal, which has been received in the step 2004, into the setting information DB 111 in the step 2008.

The setting information DB 111 may be constituted by tables every terminal, for example, a table 800 as to the setting information of the terminal 30 and another table 810 as to the setting information of the terminal 40 as represented in FIG. 13.

In the example of the table 800, pairs made between candidates for the setting information of the terminal 30 and priority orders are held in an entry 802, an entry 804, and an entry 806.

In such a case that the information indicated in the table 800 has already been registered in the setting information DB 111, when a terminal again registers a candidate for setting information, the setting information registering function 103 of the management server 10 updates such a table related to the relevant terminal in accordance with the step 2008.

Also, the setting information searching function 104 of the management server 10 searches the plural setting information for the encrypted communications of the terminal 30 and the terminal 40 for coincident setting information in the step 2108 of FIG. 8.

In the step 2108, the setting information searching function 104 of the management server 10 searches the setting information for the encrypted communications for the coincident setting information with reference to both the table 800 and the table 810 of FIG. 13.

First of all, such entries that contents of setting information thereof are made coincident with each other are extracted from the entries of the table 800 and the table 810. In the example of FIG. 13, both the entry 802 and the entry 814 are extracted, and both the entry 804 and the entry 812 are extracted.

It should also be understood that when there is no such entries that contents of setting information thereof are coincident with each other, the setting information searching function 104 fails in the searching operation.

The information (setting values) transmitted in the step 2002 has been described in the entries of the respective setting information as to the table 800 and the table 810. In the step 2108, such entries that all of the setting values described in these entries are made coincident with each other are extracted. For instance, in the case that a sort of encryption algorithm employed so as to encrypt communication data, a length of a key, a sort of hash function used so as to detect an alteration of the communication data are described in one entry, such an entry that all of these three setting values are made coincident with each other is extracted in the step 2108.

Setting values which are described in an entry may be described in such a manner that the setting values are adjustable, for example, an encryption algorithm: algorithm "A", a length of a key: longer than, or equal to 64 bits, and a hash function: either function "A" or function "B". In this case, when this setting information is compared with another setting information, namely, an encryption algorithm: algorithm "A", a length of a key: longer than, or equal to 128 bits, and a hash function: either function "B" or function C in the step 2108, the first-mentioned setting information is not completely coincident with the last-mentioned setting information. However, since the respective settable ranges are overlapped with each other, for example, the encryption algorithm: algorithm "A", the length of the key: 128 bits, and the hash function: function "B" may be recognized as the coincident entry.

In the case that settable ranges of plural items are overlapped with each other, setting values may be alternatively determined in accordance with predetermined priority degrees among the setting items.

In the case that there are plural entries whose setting information are coincident with each other, one set of setting information is selected in accordance with predetermined priority orders of terminals in such a manner that, for instance, a terminal which accepts a connection request owns a top priority, as compared with another terminal which issues the connection request.

In the example of FIG. 13, in such a case that it is previously determined that the terminal 40 which accepts the connection request owns the top priority, as compared with the terminal 30 which issues the connection request, the management server 10 refers to the priority order column (priority order of entry 812 is 1, and priority order of entry 814 is 2) of the terminal 40 contained in the coincident entries, and selects the set "B" having the higher priority order, and thus, can succeed in the searching operation of the setting information in the step 2108.

Also, the management server 10 may alternatively select one set of setting information from the coincident entries in accordance with a predetermined selection base.

In this case, the setting information DB (table 800 and table 810) need not provide a priority order column. A terminal registers one, or more pieces of the setting information into the setting information DB 111, whereas the management sever 10 searches the setting information for plural pieces of such setting information which are coincident with each other, and then, selects one set of setting information from the plural pieces of the coincident setting information in accordance with the predetermined selection base.

As to the selection base, for instance, an encryption strength of an encryption algorithm may be employed as this selection base, or a length of a key used so as to encrypt communication data may be employed as a selection base in a communicating operation which requires a higher security. Alternatively, in the case that communication performance is required, ease of encrypting process operation by an encryption algorithm, and/or ease of calculating process operation by a hash function which is employed so as to detect an alteration may be employed as the selection base.

Although this embodiment mode has exemplified the communicating operation for designating the terminal ID, a user who uses a terminal may be alternatively designated as a communication counter party.

In such a case that a user who uses a terminal is designated, while both a public key certificate owned by the user and a user ID have been previously stored in the storage medium 68 having the portability, the storage medium 68 is inserted into the reading apparatus 67 of the terminal, so that an attribute of the user may be alternatively reflected to the terminal.

In such a case that the user extracts the storage medium 68 having the portability from the reading apparatus 67, the attribute of the user is not reflected to the terminal.

If such a process operation is carried out, then it is possible to judge as to whether or not the user is operating the terminal when a connection is made from another terminal. That is, at the same time when the attribute of the user is reflected to the terminal, the process operation of FIG. 7 is carried out so as to register both the user ID and the address of the terminal in the management server 10, and at the same time when the attribute of the user is not reflected to the terminal, such a process operation that "register" is replaced by "delete" in the flow chart of FIG. 7 is carried out. As a result, in the case that terminals are under use, the user can be connected without paying a specific attention to such a fact that user utilizes which terminal.

The specification and drawings are, accordingly, to be regarded in an illustrative rather than a restrictive sense. It will, however, be evident that various modifications and changes may be made thereto without departing from the spirit and scope of the invention as set forth in the claims.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A communication system in which a communication source apparatus and a communication destination apparatus perform an encrypted communication with each other; wherein:

the communication source registers, at a management server, store a first setting information for the encrypted communication including a plurality of setting items whose setting values are to be determined in order to designate an encryption key available for the communication source apparatus;

the communication destination registers, at the managing server, store a second setting information for the encrypted communication including a plurality of setting items whose setting values are to be determined in order to designate an encryption key available for the communication destination apparatus;

said communication source apparatus transmits a connection request between communication source apparatus and communication destination apparatus to the management server;

said management server searches the first and the second setting information having been previously registered into the management server respectively by both said communication source apparatus and said communication destination apparatus for setting information, for at least one of the setting items, the setting item to be searched being available for both the communication source apparatus and the communication destination apparatus designated by reception of the connection request in order to generate an encryption key; and in the case that the management server can search for the setting item in order to generate the encryption key available for both the communication source apparatus and the communication destination apparatus, both the communication source apparatus and the communication destination apparatus perform an encrypted communication by employing the encryption key for the encrypted communication, which has been produced based upon the searched setting item for the encrypted communication, without the management server relaying data of the encrypted communication between the communication source apparatus and the communication destination apparatus.

2. A communication system as claimed in claim 1 wherein:
said management server transmits said connection request to said communication destination apparatus; and
said communication destination apparatus judges as to whether or not said connection request can be accepted.

3. A communication system as claimed in claim 1 wherein:
said management server produces the key used in said encrypted communication based upon the coincident setting item for the encrypted communication, and transmits said key used in the encrypted communication to both the communication source apparatus and the communication destination apparatus.

4. A communication system as claimed in claim 1 wherein:
said management server produces information which constitutes a seed of the key used in the encrypted communication based upon the setting item for the encrypted communication, and transmits said produced information which constitutes the seed of the key used in the encrypted communication to both the communication source apparatus and the communication destination apparatus; and
both said communication source apparatus and said communication destination apparatus produce the keys used in said encrypted communication based upon the received information which constitutes the seed of the key, respectively.

5. A communication system as claimed in claim 1 wherein;
each of said communication source apparatus and said communication destination apparatus registers the setting item of said setting information for the encrypted communications into said management server, while priority orders are applied to said plurality of setting information for the encrypted communications; and
said management server refers to said priority orders so as to search said plurality of setting item.

6. A communication system as claimed in claim 1 wherein:
said communication source apparatus establishes an encrypted communication path between the own communication source apparatus and said management server in order to transmit said connection request to said communication destination apparatus; and
said management server establishes an encrypted communication path between the own management server and said communication destination apparatus in order to transmit said connection request from said communication source apparatus to said communication destination apparatus by said communication source apparatus.

7. A communication system as claimed in claim 6 wherein:
said communication system is further comprised of:
a validation server;
said communication source apparatus transmits a public key certificate of said communication source apparatus to said management server;

said management server requests said validation server to verify the public key certificate of said communication source apparatus;
said validation server verifies the public key certificate of said communication source apparatus, and then, responds a validation result to said management server; and
said management server establishes said encrypted communication path between said communication source apparatus and said management server in the case that the validation as to the public key certificate of said communication source apparatus can succeed.

8. A communication system as claimed in claim 7 wherein:
said communication destination apparatus transmits a public key certificate of said communication destination apparatus to said management server;
said management server requests said validation server to verify the public key certificate of said communication destination apparatus;
said validation server verifies the public key certificate of said communication destination apparatus, and then, responds a validation result to said management server; and
said management server establishes said encrypted communication path between the said management server and said communication destination apparatus in the case that the validation as to the public key certificate of said communication destination apparatus can succeed.

9. A communication system as claimed in claim 8 wherein:
said communication source apparatus or said communication destination apparatus requests said management server to transmit the public key certificate of said management server;
said management server transmits said requested public key certificate of said management server to said apparatus that requested transmitting the public key certificate; and
said apparatus that requested transmitting the public key certificate receives the public key certificate of said management server from said management server, and verifies the public key certificate of said management server, and also, establishes said encrypted communication path between said communication source apparatus and said management server in such a case that the validation can succeed.

10. A communication system as claimed in claim 6 wherein:
said communication source apparatus and/or said communication destination apparatus registers the setting information for the encrypted communication between said communication source apparatus and said communication destination apparatus into said management server by employing said encrypted communication path.

11. A communication system as claimed in claim 1, wherein:
the management server is configured to produce an encrypted key and to distribute the encrypted key to each of the communication apparatuses.

* * * * *